United States Patent
Freitag et al.

[11] Patent Number: 6,002,704
[45] Date of Patent: Dec. 14, 1999

[54] MONOLITHIC, NON-PLANAR RING LASER WITH Q-SWITCHED SINGLE-FREQUENCY OPERATION

[75] Inventors: Ingo Freitag; Andreas Tünnermann, both of Hannover, Germany

[73] Assignee: InnoLight Innovative Laser und Systemtechnik GmbH, Hannover, Germany

[21] Appl. No.: 09/008,333

[22] Filed: Jan. 16, 1998

[30] Foreign Application Priority Data

Jan. 25, 1997 [DE] Germany .......................... 197 02 681

[51] Int. Cl.[6] ........................................... H01S 3/083
[52] U.S. Cl. ................................. 372/94; 372/11
[58] Field of Search ................... 372/94, 11, 93, 372/66

[56] References Cited

U.S. PATENT DOCUMENTS

| | | | |
|---|---|---|---|
| 4,578,793 | 3/1986 | Kane et al. | 372/94 |
| 4,747,111 | 5/1988 | Trutna, Jr. et al. . | |
| 4,797,896 | 1/1989 | Kane | 372/94 |
| 4,955,034 | 9/1990 | Scerbak | 372/94 |
| 5,007,065 | 4/1991 | Trutna, Jr. | 372/94 |
| 5,023,477 | 6/1991 | Valley et al. | 372/21 |
| 5,027,367 | 6/1991 | Rea, Jr. et al. | 372/94 |
| 5,148,444 | 9/1992 | Berger | 372/94 |
| 5,177,764 | 1/1993 | Nilsson | 372/94 |
| 5,870,416 | 2/1999 | Yoon et al. | 372/93 |

FOREIGN PATENT DOCUMENTS

| | | |
|---|---|---|
| 0 272 912 B1 | 6/1995 | European Pat. Off. . |
| 40 08 226 A1 | 9/1991 | Germany . |

OTHER PUBLICATIONS

Optics Letters/vol. 20, No. 9; May 1, 1995, pp. 1020–1022.
Optics Letters/vol. 19, No. 18;Sep. 15, 1994,pp. 1427–1429.
Optics Letters/vol. 18, No. 17;Sep. 1, 1993;pp. 1418–1419.
Optics Letters/vol. 18, No. 3; Feb. 1, 1993; pp. 203–204.

Primary Examiner—Leon Scott, Jr.
Attorney, Agent, or Firm—Shlesinger, Arkwright & Garvey LLP

[57] ABSTRACT

A monolithic, non-planar ring laser having Q-switched single-frequency operation comprises a diode laser as the pumping light source of which the pumping light is coupled to a ring laser crystal (2) that comprises at least three total reflection faces B, C and D and a dielectrically coated crystal face A designed as a coupling and decoupling mirror. To obtain high-power laser pulses in the highly stable single-frequency mode and further to achieve compactness, the following design solutions are offered: 1. A switching crystal (20) having an appropriate index of refraction which can be moved to a distance of about one laser beam wavelength to one of the total reflection faces B, C, D of the ring laser crystal (2) to decouple the evanescent wave field and thereby to suppress laser oscillation, said switching crystal being displaceable away from the total reflection face to generate laser pulses, 2. The ring laser crystal (2) is composed of a laser material having saturable losses at the lasing transition (lasing wavelength), 3. The ring laser crystal (30) consists of at least one active laser material crystal (32, 34) and of a further crystal (36) made of a saturable absorber material, 4. The ring laser crystal (2) is fitted at least on one surface with a saturable absorber-material layer (40), said layer preferably being deposited epitaxially, where the ring laser crystal, by means of a non-planar beam path, causes reciprocal rotation of the direction of polarization of the lasing light and by means of the Faraday effect in a permanent magnetic field (16) implements non-reciprocal rotation of the direction of polarization of the lasing light.

26 Claims, 3 Drawing Sheets

MONOLITHIC, NON-PLANAR RING LASER WITH Q-SWITCHED SINGLE-FREQUENCY OPERATION

BACKGROUND OF THE INVENTION

The invention relates to a monolithic, non-planar ring laser. In particular, this invention is directed to a laser capable of generating high-power laser pulses in single-frequency operation using active or passive Q-switching.

U.S. Pat. No. 4,797,896 to Kane describes a monolithic, non-planar ring laser operated in continuous, single-frequency, which however incurs the drawback of not allowing pulse operation, so that high peak powers are impossible.

A monolithic, non-planar ring laser Q-switched by an antiresonant saturable Fabry-Perot absorber is known from the "Optics Letters" vol. 20, #9, pp 1020–1022. This laser however suffers from the drawback of allowing only passive Q-switching. High pulse-repetition rates in the MHz range reduce peak powers to a few watts. Moreover the manufacture of such antiresonant saturable Fabry-Perot absorbers is costly.

A Q-switched microchip laser with a resonator-internal, saturable absorber or with Q-switching Cr, Nd:YAG solid lasers of which the active medium suffers saturable losses at lasing transition is known from the "Optics Letters" vol. 19, #18, pp 1427–1429 and vol. 18, #3, pp 203–204 as well as vol. 18, #17, pp 1418–1419. These lasers known from said publications preclude high average powers in single-frequency operation.

The European patent document EP 0,272,912 describes Q-switching of conventional solid lasers by acousto-optic or separately saturable absorbers in the laser resonator. This design incurs the drawback of a discrete construction, entailing stability and efficiency degradation. Single-frequency operation is possible only at high equipment cost or only at low powers.

The object of the present invention is to so design a ring laser of the initially cited species that it will implement high-power laser pulses in highly stable single-frequency operation. Moreover compactness is desired.

The non-planar monolithic ring laser of the invention by means of active or passive Q-switching allows efficiently generating short, high-power laser pulses in high-stability frequency operation. By combining pulse repetition rates in the kHz range and a short resonator length, nanosecond pulses with peak powers in the kW range are achieved.

Compactness, high stability and reliability are achieved by means of the laser's monolithic structure. The (longitudinal) excitation of the invention using a diode laser allows high total electro-optic efficiency. Mode-selective pumping constrains the emission of the transverse fundamental mode with diffraction-determined beam quality. On the whole the optic excitation can be carried out with up to four diode lasers using a coupling mirror of the ring laser.

BRIEF DESCRIPTION OF THE DRAWINGS

The invention is elucidated below in relation to the attached drawings.

Identical elements in the different drawings are denoted by the same references.

DETAILED DESCRIPTION OF THE INVENTION

Figure 1:
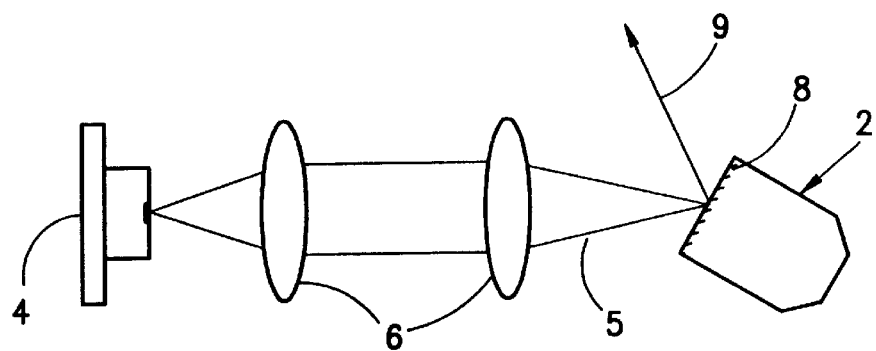
FIG. 1 diagrammatically shows the mode-selective excitation of a monolithic, non-planar ring laser using a diode laser.
Figure 2C:
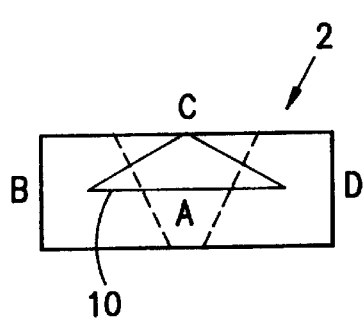
FIGS. 2a, 2b, 2c and 2d show the perspective, top view, front view and side view respectively of the typical geometry for a monolithic laser with a non-planar beam path.
Figure 2D:
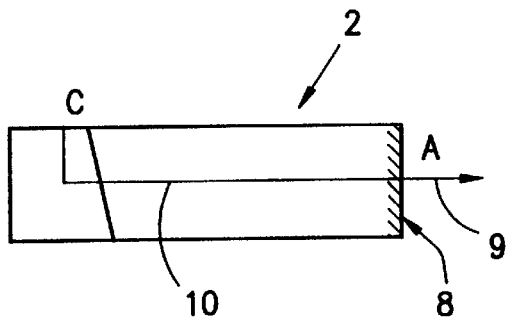
Figure 2B:
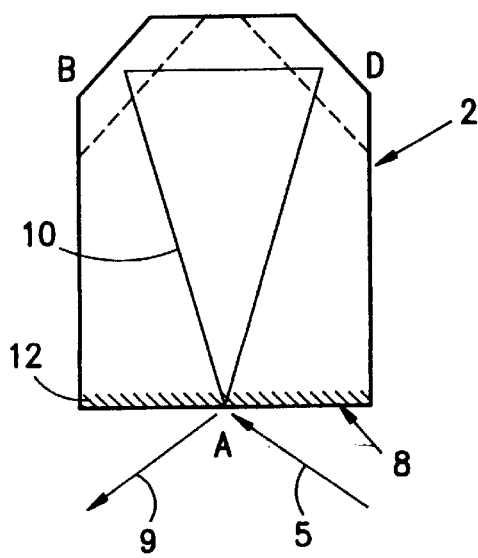
Figure 2A:
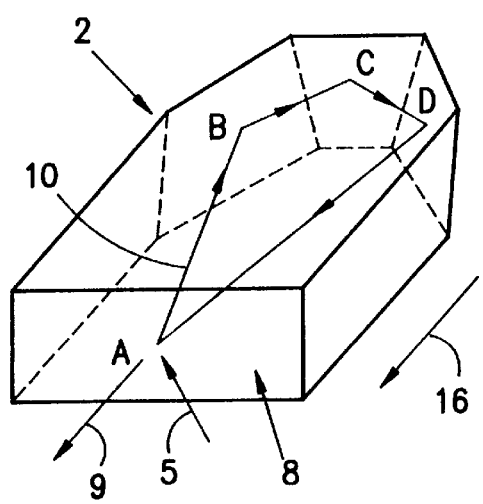

FIG. 1 is a functional diagram of a monolithic, non-planar ring laser having a ring laser crystal 2 as the monolithic resonator and a diode laser 4 for mode-selective excitation, of which the pumping light 5 is focused by a pumping light transfer optics 6 on the ring laser crystal 2. The pump light 5 is coupled, and the laser light 9 is decoupled by a coupling and decoupling mirror 8. The longitudinal excitation makes possible high electro-optic total efficiency. Mode-selective pumping constrains emission to the transverse fundamental mode with diffraction-limited beam quality. The optic excitation can be implemented through the ring laser's coupling mirror 8 with up to 4 diode lasers.

Single-frequency operation is achieved using an internal optic diode as the diode laser 4. For that purpose a non-planar beam path 10 is produced in the monolithic resonator (ring laser crystal 2 (FIGS. 1, 2), entailing reciprocal polarization rotation. In the process the laser beam 9 undergoes, at least at three faces B, C and D (FIG. 2), total internal reflection in the laser crystal 2. As furthermore shown in FIG. 2, reflection takes place at a crystal face A fitted with at least one dielectric layer 12 and forming the laser's coupling and decoupling mirror 8. On one hand the dielectric layers 12 assure high transmission and hence efficient coupling of the pumping light of the diode laser 4; on the other hand they determine the degree of decoupling of the laser radiation. Furthermore the Faraday effect is utilized in the laser medium in order to ensure non-reciprocal rotation of polarization in a magnetic field 16. A difference in losses of the two directions of circulation in the ring laser is obtained by the different losses of the decoupling mirror 8 for the s and p polarizations, whereby oscillation takes place only in the less lossy direction of circulation. Single-frequency operation is simultaneously constrained thereby in homogeneously broadened media.

Q-switching designs to generate short pulses in the non-planar ring lasers are discussed below in relation to FIGS. 2, 3, 4 and 5.

Figure 3:
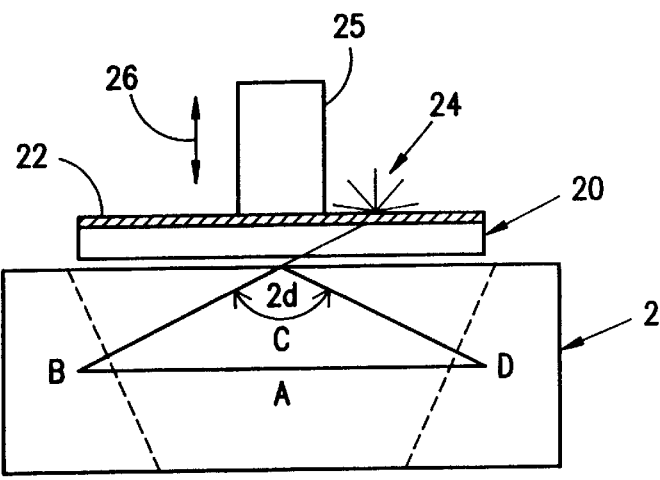
FIG. 3 shows the decoupling of an evanescent field by frustrating total reflection in a ring laser of the invention.
Figure 4C:
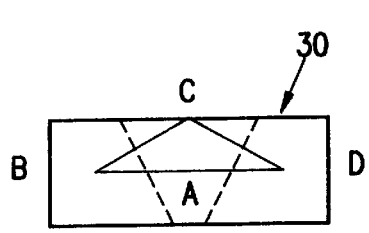
FIGS. 4a, 4b, 4c and 4d show the perspective, top view, front view and side view respectively of a non-planar ring laser having a diffusion bonded crystal composed of two pieces of a laser-active material and of one piece of a saturable absorber
Figure 4D:
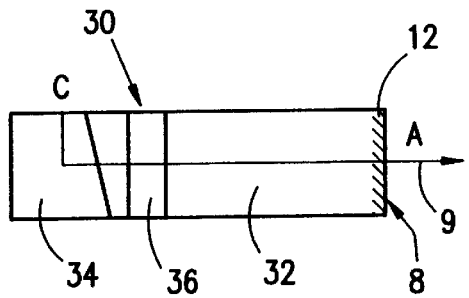
Figure 4B:
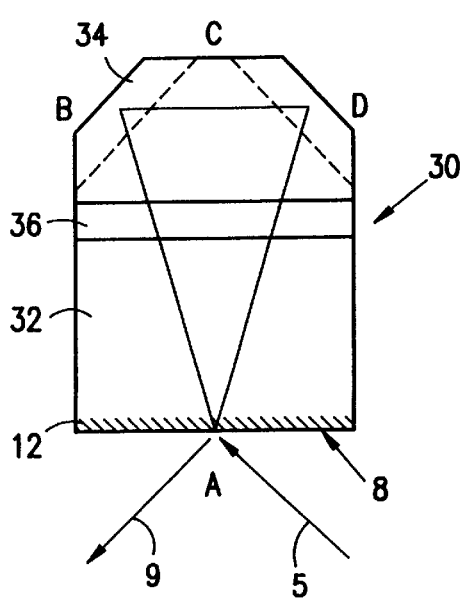
Figure 4A:
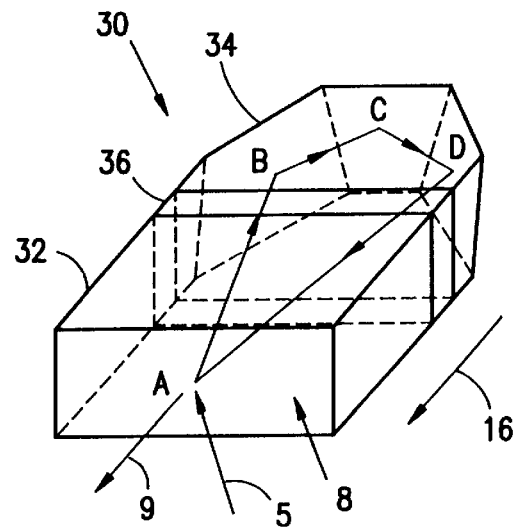
Figure 5C:
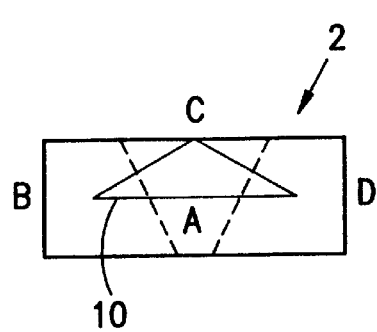
FIGS. 5a, 5b, 5c and 5d show the perspective, top view, front view and side view respectively of another embodiment of the Q-switched, monolithic, non-planar ring-laser.
Figure 5D:
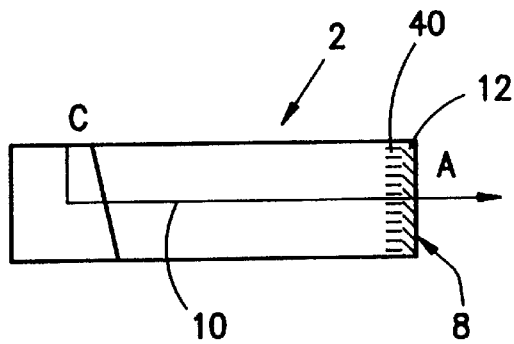
Figure 5B:
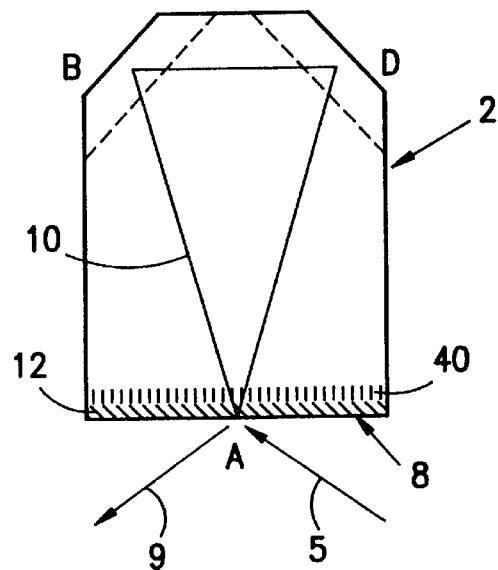
Figure 5A:
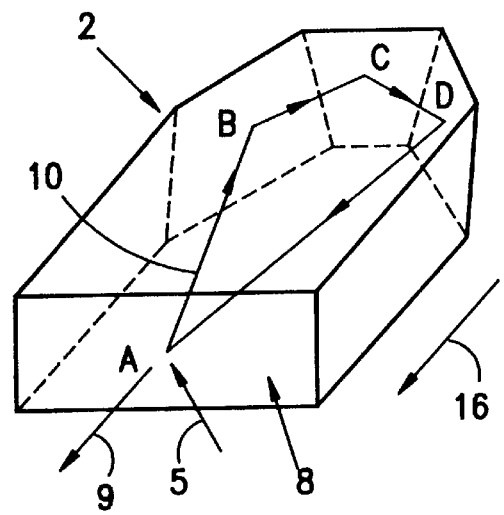

1. Monolithic, Non-Planar Ring Laser with Active Q-Switching by Frustrated Total Reflection (FIG. 3)

The beam path of known, monolithic ring lasers is produced by several total reflections in the active medium (FIG. 2). By displacing a switching crystal of the invention 20 of a medium with a suitable index of refraction (FIG. 3) to a distance of about one lasing wavelength to one of the reflection surfaces, namely surface C in FIG. 3, the evanescent field from the laser resonator 2 is decoupled (frustration of total reflection at the surface C). In this case the laser radiation incurs high losses and the quality of the resonator 2 is degraded. The high losses entail a large threshold inversion density in the laser medium, whereby, in the case of continuous excitation of the active medium, large energies may be stored before laser emission takes place. When moving the switching crystal 20 away from the face C, the conditions of total reflection will again be met, the resonator Q rapidly becomes high, and because of high inversion, a short, high-power laser pulse is generated. Q-switching can be carried out for arbitrary materials of the active medium. Suitable switching materials on one hand are crystals made of the laser material used for the ring laser, such crystals having a region 22 which may be roughened on the side away from the laser crystal to generate diffuse reflection 24 for the purpose of achieving high losses, or region 22 may have a dielectric anti-specular layer designed for the laser wavelength to prevent reflections. On the other hand, a plurality of other materials may be used for the switching crystal 20, which have an index of refraction>n·sinα, where α is the angle of incidence of the laser beam at the point of total reflection and n is the index of refraction of the ring laser crystal. Total-reflection frustration and hence modulation of resonator Q can be achieved by using piezo-ceramics 25 to move (arrow 26) the medium 20 with pulse repetition rates into the range of several kHz. This is active Q-switching during which the pulse repetition rate can be adjusted by an external electric signal applied to the piezo-ceramic 25. Because no components used in Q-switching need be introduced into the resonator 2, high efficiency, stability and reliability are assured.

2. Monolithic, Non-Planar Ring Laser with Passive Q-Switching by Active Laser Medium having Saturable Losses The configuration of this ring laser is analogous to the known monolithic ring laser shown in FIG. 2. However in this respect the invention provides an active laser medium 5 which simultaneously shows saturable losses at lasing transition, that is at the wavelength of laser emission. The high losses cause high threshold inversion density in the laser medium. A photon field builds up in the resonator 2 when this threshold inversion is reached and rapidly bleaches the laser material, that is, it reduces the saturable losses and hence increases resonator the Q of the. This is passive Q-switching wherein the pulse repetition frequency cannot be controlled by an external signal. However there is a linear relationship between the pulse repetition rate and pumping power, hence this rate can be adjusted over a wide range. Moreover, at a given pumping power, the pulse parameters can be adjusted by suitably selecting the parameters of the laser medium. However, because of the need for making an optical diode, only those materials are suitable that lack natural birefringence, namely, among others, isotropic standard laser materials with codoping such as Cr, Nd:YAG, Cr, Yb:YAG or Cr, Nd:LSB.

3. Monolithic, Non-Planar Ring Laser with Passive Q-Switching by a Saturable Absorber Inside the Resonator Basically the configuration of this ring laser is similar to the known monolithic ring laser of FIG. 2. The invention however uses predominantly a ring laser crystal 30 made of a solid composed of at least one crystal, in the present embodiment two crystals 32, 34 made of an active laser material (for instance Nd:YAG) or Nd:LSB and a crystal 36 preferably mounted between the two crystal 32 and 34 and made of a saturable absorber material such as $Cr^{4+}$:YAG (FIG. 4). The ring laser material may be a material which lacks the property of natural birefringence. To implement the internal, optical diode, at least one of the crystal consists of a material allowing Faraday-effect rotation of the direction of light polarization at the laser wavelength. Advantageously a Faraday-effect active medium such as Nd:YAG is used. The spatial lasing separation of the two active-medium crystal 32 and 34 from the saturable losses in the absorber 36 allows independent parameter optimization for efficient laser and pulse operation. The crystals are connected by diffusion bonding. Atomic bonds between the materials are achieved at the boundary surface by said diffusion bonding and the resulting structure behaves macroscopically like a crystal. Optic losses at the boundary surface are avoided by diffusion bonding connection and the crystal, when polished, behaves like a standard laser material. The use of the above mentioned configuration of active medium 32/saturable absorber 36/active medium 34 of FIG. 4 is advantageous. The length of the medium or crystal 32 fitted with a dielectric coating 12 (coupling and decoupling mirror 8) preferably shall be selected to correspond to approximately one absorption length in the active medium and illustratively amounts to several, for instance 2–4 mm. As a result efficient absorption of the pumping radiation 5 is assured and at the same time high intensities of said pumping radiation in the saturable absorber 36 are precluded from affecting said absorber's switching properties. The length of the saturable absorber 36 is determined by the desired switching properties and falls in the approximate range of 1–3 mm. The length of the active medium, that is of the crystal 34 with the faces B, C and D for internal total reflection is substantially determined by manufacturing constraints.

4. Monolithic, Non-Planar Ring Laser with Passive Q-Switching by a Thin Layer of Saturable Absorber Material on at Least One Face of the Ring Laser Crystal (FIG. 5)

The configuration of this ring laser is substantially similar to the known monolithic ring laser of FIG. 2. However in the invention at least one of the faces A, B, C, D of the ring laser materials such as Nd:YAG, Yb:YAG or Nd:LSB includes a thin layer 40 of saturable absorber material such as Cr:YAG. The ring laser material may also be selected to lack natural birefringence. Typically the absorber thickness is several 100μ, preferably 100 or 200μ, and is deposited preferably epitaxially. If the ring laser and absorber materials are appropriately selected, for instance, respectively. Nd:YAG and $Cr^{4+}$:YAG, the layers of absorber material grow to correspond to the crystal structure of the ring laser crystal and thereby a monolithic block of laser crystal is obtained. This block then can be processed like a conventional laser material (for instance being polished optically). Advantageously the absorber material is deposited on the face A of the ring laser crystal designed as the coupling and decoupling mirror 8. Furthermore the absorber material also may be deposited on one of the faces B, C, D of total reflections or also on several or on all faces A, B, C, D. In such a case, already prefabricated, conventional ring laser crystals as shown in FIG. 2 may be retrofitted for Q-switching by the deposition of a layer of saturable absorber material. As regards manufacture, the subsequent fine polishing and dielectric coating of said surface will be non-critical.

We claim:

1. A monolithic non-planar ring laser with single-frequency Q-switching, comprising:
   a) a pumping light source for emitting a laser beam;
   b) a pumping light transfer optic provided for receiving the laser beam emitted from said pumping light source, the beam being more focused upon traveling therethrough;
   c) a ring laser crystal provided for receiving the laser beam focused by said pumping light transfer optic, said ring laser crystal having a dielectrically coated crystal face and three total reflection faces; and,
   d) a switching crystal disposed outside said ring laser crystal at one of said three total reflection faces, said switching crystal being displaceable toward one of said three total reflection faces to a distance of about one lasing wavelength relative to said one of said three total reflection faces for decoupling an evanescent wave field, said switching crystal being displaceable away from said one of said three total reflection faces for generating laser pulses.

2. A ring laser as in claim 1, wherein:
a) said ring laser crystal includes a material lacking natural birefringence.

3. A ring laser as in claim 1, wherein:
a) said switching crystal and said ring laser are the same material.

4. A ring laser as in claim 1, wherein:
a) said switching crystal is roughened on a side facing away from said ring laser crystal for generating diffuse reflection.

5. A ring laser as in claim 1, wherein:
a) said switching crystal is fitted with an antireflecting layer on a side facing away from said ring laser crystal for preventing reflection.

6. A ring laser as in claim 1, wherein:
a) said switching crystal and said ring laser crystal are different materials, the index of refraction of said switching crystal being greater than the product of the index of refraction of said ring laser crystal and the angle of incidence of the laser beam at the point of total reflection.

7. A ring laser as in claim 1, wherein:
a) said ring laser crystal includes an active medium, said active medium being at least one of Nd:YAG, Yb:YAG and Nd:LSB.

8. A ring laser as in claim 1, further including:
a) a piezoceramic for displacing said switching crystal relative to one of said three total reflection faces.

9. A monolithic non-planar ring laser with single-frequency Q-switching, comprising:
a) a pumping light source for emitting a laser beam;
b) a pumping light transfer optic provided for receiving the laser beam emitted from said pumping light source, the beam being more focused upon traveling therethrough;
c) a ring laser crystal provided for receiving the laser beam focused by said pumping light transfer optic, said ring laser crystal having a dielectrically coated crystal face and three total reflection faces; and,
d) said ring laser crystal including a laser material undergoing saturable losses at lasing transition.

10. A ring laser as in claim 9, wherein:
a) said ring laser crystal including a material lacking natural birefringence.

11. A ring laser as in claim 9, wherein:
a) said ring laser crystal including a material, said material being at least one of Cr,Nd:YAG, Cr,Yb:YAG and Cr,Nd:LSB.

12. A monolithic non-planar ring laser with single-frequency Q-switching, comprising:
a) a pumping light source for emitting a laser beam;
b) a pumping light transfer optic provided for receiving the laser beam emitted from said pumping light source, the beam being more focused upon traveling therethrough;
c) a ring laser crystal provided for receiving the laser beam focused by said pumping light transfer optic, said ring laser crystal having a dielectrically coated crystal face and three total reflection faces; and,
d) said ring laser crystal having at least one active crystal including an active laser material and an absorber crystal including a saturable absorber material.

13. A ring laser as in claim 12, wherein:
a) said at least one active crystal includes two active crystals; and,
b) said absorber crystal being disposed between said two of said at least one active crystal, and said two active crystals of said at least one active crystal being spatially separated.

14. A ring laser as in claim 12, wherein:
a) said at least one active crystal is diffusion bonded to said absorber crystal.

15. A ring laser as in claim 12, wherein:
a) one of said at least one active crystal includes a dielectric coating having a length of about one absorption length in the active laser material.

16. A ring laser as in claim 12, wherein:
a) said ring laser crystal includes a material lacking natural birefringence.

17. A ring laser as in claim 12, wherein:
a) said active crystal includes a material, said material being at least one of Nd:YAG, Yb:YAG and Nd:LSB.

18. A ring laser as in claim 12, wherein:
a) said absorber crystal includes $Cr^{4+}$:YAG.

19. A monolithic non-planar ring laser with single-frequency Q-switching, comprising:
a) a pumping light source for emitting a laser beam;
b) a pumping light transfer optic provided for receiving the laser beam emitted from said pumping light source, the beam being more focused upon traveling therethrough;
c) a ring laser crystal provided for receiving the laser beam focused by said pumping light transfer optic, said ring laser crystal having a dielectrically coated crystal face and three total reflection faces; and,
d) a layer of saturable absorber material provided on at least one of said dielectrically coated crystal face and said three total reflection faces.

20. A ring laser as in claim 19, wherein:
a) said layer of saturable absorber material has a thickness that is a multiple of 100 $\mu$m.

21. A ring laser as in claim 19, wherein:
a) said layer of saturable absorber material is epitaxially deposited on at least one of said dielectrically coated crystal face and said three total reflection faces.

22. A ring laser as in claim 19, wherein:
a) said layer of saturable absorber material is deposited on said dielectrically coated crystal face.

23. A ring laser as in claim 19, wherein:
a) said layer of saturable absorber material is provided on at least one of said three total reflection faces.

24. A ring laser as in claim 19, wherein:
a) said ring laser crystal includes a material, said material lacking natural birefringence.

25. A ring laser as in claim 19, wherein:
a) said ring laser crystal includes a material, said material being at least one of Nd:YAG, Yb:YAG and Nd:LSB.

26. A ring laser as in claim 19, wherein:
a) said layer of saturable absorber material includes $Cr^{4+}$:YAG.

* * * * *